United States Patent [19]

Hotovy

[11] Patent Number: 4,530,167
[45] Date of Patent: Jul. 23, 1985

[54] IN-BIN, CONTROLLED ATMOSPHERE, GRAIN DRYING SYSTEMS AND THE LIKE

[75] Inventor: James R. Hotovy, Columbus, Nebr.

[73] Assignee: The Wickes Corporation, Santa Monica, Calif.

[21] Appl. No.: 605,136

[22] Filed: Apr. 30, 1984

[51] Int. Cl.³ .............................................. F26B 21/08
[52] U.S. Cl. .......................................... 34/47; 34/233; 34/50; 34/54
[58] Field of Search ................... 137/3, 88, 93, 625.4, 137/625.48; 34/233, 47, 86, 54, 46, 50

[56] References Cited

U.S. PATENT DOCUMENTS

| | | | |
|---|---|---|---|
| 1,431,146 | 10/1922 | Bolling | 34/47 |
| 1,550,422 | 8/1925 | Braemer | 34/46 |
| 1,601,966 | 10/1926 | Harris | 34/47 |
| 2,502,054 | 3/1950 | Marchak | 137/625.4 |
| 3,378,065 | 4/1968 | Mitchell et al. | 34/233 |
| 3,380,174 | 4/1968 | McClaren | 34/50 |
| 4,268,247 | 5/1981 | Freze | 34/15 |

Primary Examiner—Larry I. Schwartz
Attorney, Agent, or Firm—Learman & McCulloch

[57] ABSTRACT

An in-bin, controlled atmosphere, grain drying system has a storage chamber for holding a supply of grain or the like with a recycling duct leading from the upper end of the chamber back to a conduit for introducing air to the lower end of the chamber. A humidistat mechanism sensitive to the humidity of the air flow is provided. Also, a proportioning conduit portion has side-by-side inlets lying in substantially a common plane, one inlet connecting with the recycling duct and the other being open to atmosphere. A valve controlled by the humidistat mechanism is movable crosswisely relative to said inlets such as to admit more atmospheric air and less recycled air, or less atmospheric air and more recycled air, dependent on the humidity sensed by said humidistat mechanism.

11 Claims, 5 Drawing Figures

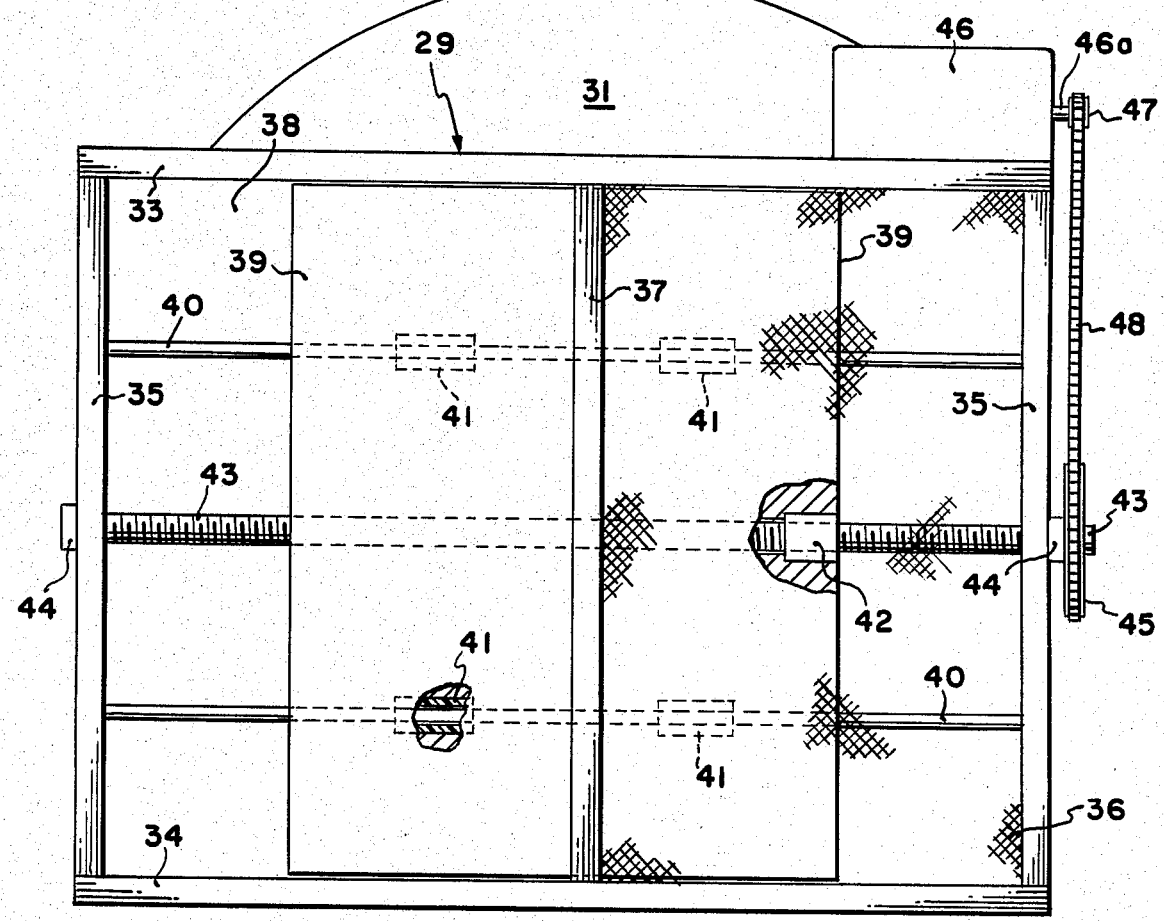
FIG. 3
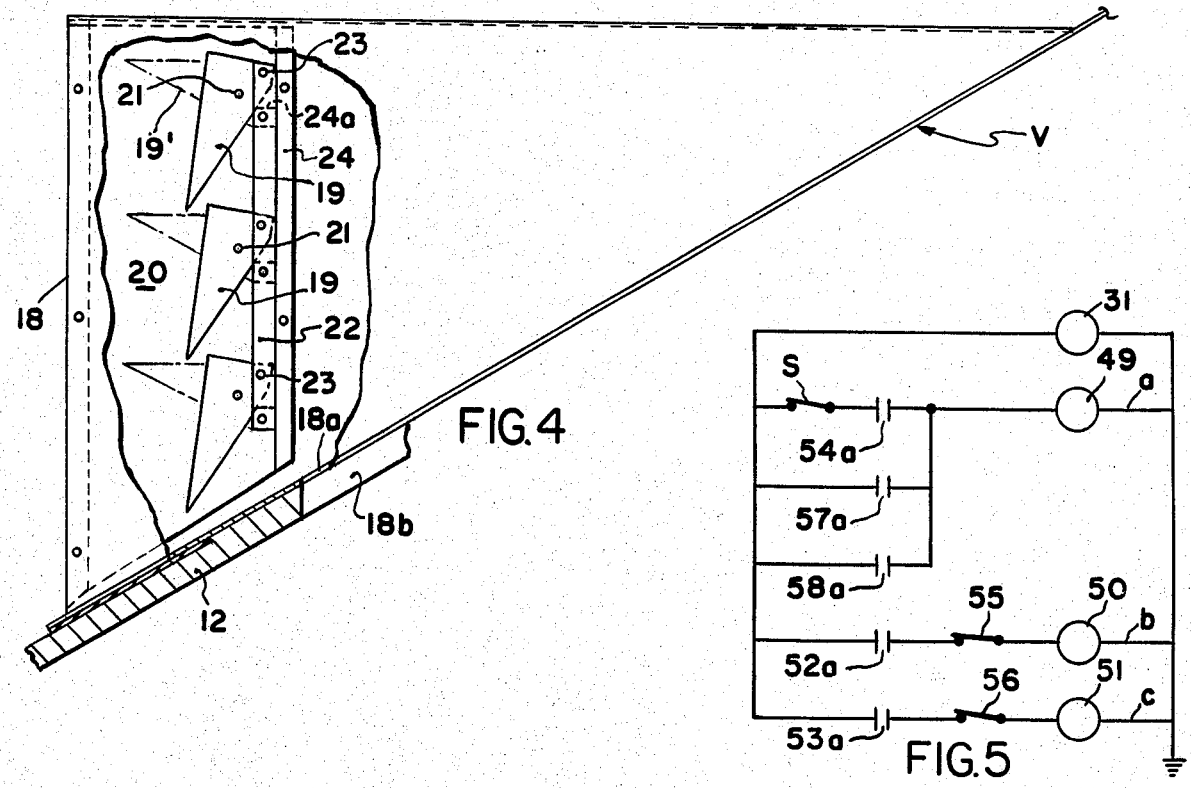
FIG. 4
FIG. 5

IN-BIN, CONTROLLED ATMOSPHERE, GRAIN DRYING SYSTEMS AND THE LIKE

BACKGROUND OF THE INVENTION

This invention relates to "natural air" drying systems for grain storage bins wherein proper amounts of moisture laden air are metered back into the drying air stream, after having passed through the bin, to mix with atmospheric air being supplied as drying air, and prevent overdrying of the grain.

Various prior art systems for recycling humid air in such systems have been proposed, as exemplified in the following patents - however, the present system differs in its relative simplicity and practicality: U.S. Pat. Nos. 1,534,499; 4,077,134; 2,318,027; 4,263,722; 3,380,174; 4,268,971.

SUMMARY OF THE INVENTION

In the present system, the desired equilibrium, with grain having a given percentage of moisture, is achieved by providing a mix of recycled air and atmospheric air which is heated and blown into the storage bin. Vents are provided to remove a significant portion of the high moisture air from the upper end of the bin. A vent duct also leads from the upper end of the bin down to a conduit which has a pair of side-by-side inlet openings, one for the recycled air from the vent duct and the other for atmospheric air to replace that proportion of the air stream which is vented from the upper end of the bin to atmosphere. The flow admitted may be heated before being moved by a fan into the lower end of the bin and a slide gate which spans the inlet openings is movable crosswisely with respect thereto to automatically admit more or less recycled air dependent on the amount of atmospheric air being admitted.

One of the prime objects of the present invention is to design a drying system of the type described which, with but a single slide gate mechanism, essentially spans a recycle duct portion and an inlet air duct portion, and directly proportions the volume of recirculated air and ambient air being supplied to achieve the desired level of relative humidity in the bin.

Another object of the invention is to design a system of the character described wherein the temperature of the recycled air is employed to warm the outside air being admitted, when the outside air is relatively cooler, to thereby decrease the load on the burner used to warm the drying air flow, and effect an energy savings which is important in cooler climes.

A further object of the invention is to provide a humidity adjusting system which uniformly dries the grain to the desired degree such that there are no over-dried volumes in the bin.

Other objects and advantages of the invention will become apparent by reference to the following specification and to the drawings.

IN THE DRAWINGS

FIG. 3 is an enlarged, fragmentary, front elevational view illustrating slide gate mechanism;

FIG. 4 is a greatly enlarged, side elevational view of a roof vent for venting to atmosphere; and FIG. 5 is a typical, schematic diagram of an electrical control circuit for the system.

Figure 1:
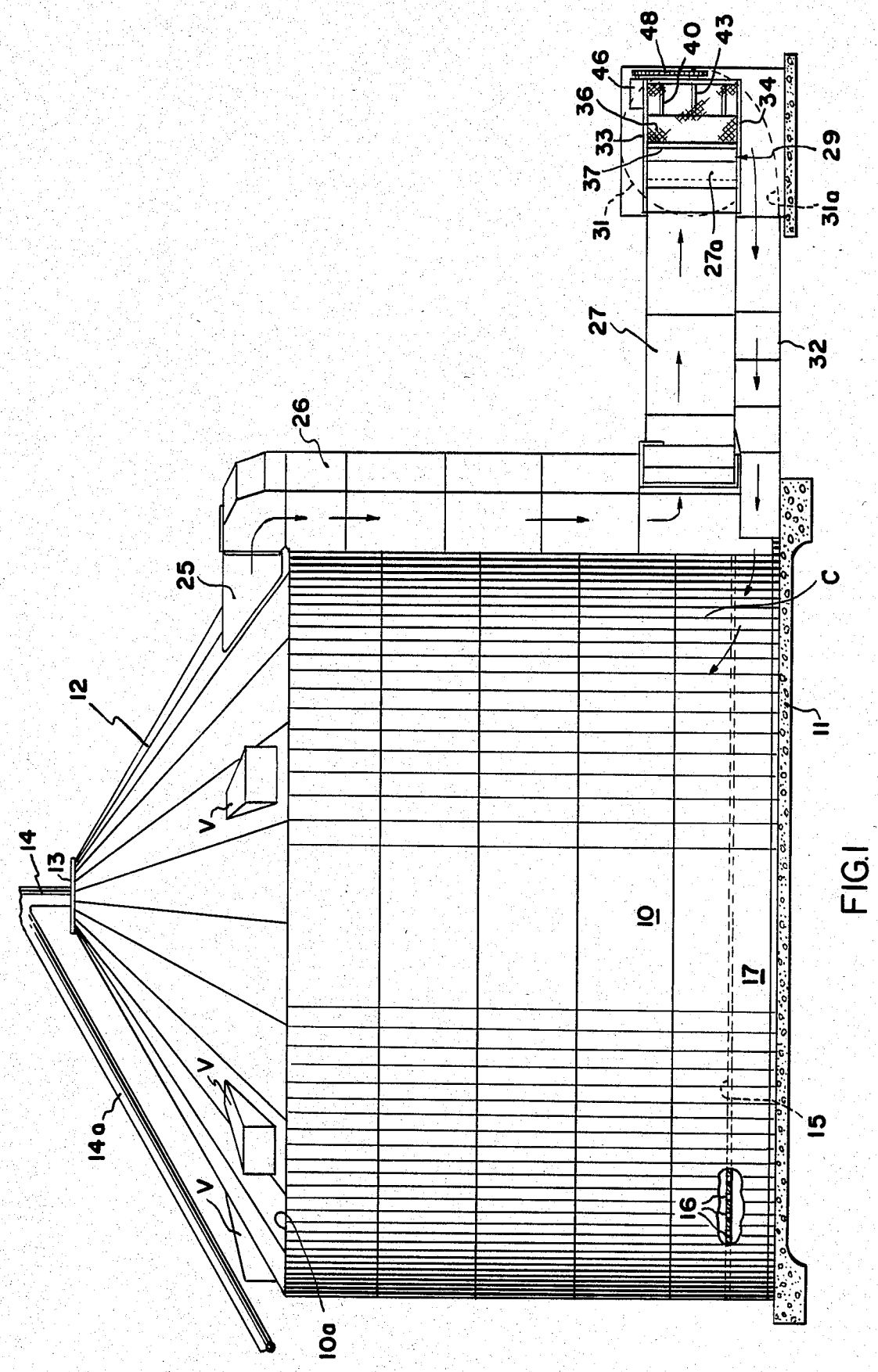
FIG. 1 is a side elevational view of a bin drying system incorporating the invention.

Referring now more particularly to the accompanying drawings, the storage bin may take the form of a metal circular bin enclosure 10, supported on a concrete base or pedestal 11, and having a conical metal roof 12 with a central upper opening 13, by means of which grain is supplied to the bin 10 through a supply pipe 14 in the usual manner. A conveyor can be utilized to supply grain to the pipe 14, via a section 14a of supply pipe 14, or the grain may be blown into the pipe 14 in any suitable well-known manner.

Provided in the roof 12 at circumferentially spaced intervals, are a series of atmospheric vents, generally designated V. Grain supplied to the bin 10, generally to the level 10a, is supported on a perforate bin floor 15, having perforations or openings 16 therein in the usual manner, and floor 15 divides the bin 10 into a grain storage chamber C and a plenum chamber 17, beneath floor 15.

As FIG. 4 indicates, the vents V open to the upper end of the grain storage bin 10, and comprise hollow, triangularly shaped housings with open outer ends 18 and openings 18a in their bottoms communicating with openings 18b cut in roof 12. Provided within each of the vents V are a series of pivotally mounted louvers 19, which are shown in fully open position in chain lines at 19'. The louvers 19 are pivotally mounted to the side walls 20 of the vent at 21, and are connected to operate in unison by straps 22 to which they are pivotally connected at 23, straps 22 having vertical movement along fixed guides 24, dependent on the static pressure within the enclosure 10. Keepers 24a can be provided to retain the connecting bars 22 for reciprocating movement along guide bars 24.

At one end of the bin a closed vent outlet conduit 25 leads to a downwardly extending duct 26, which extends along the side wall of the bin 10 exteriorly thereof. Duct 26 is provided to recycle some of the humid air from the upper end of the storage bin 10 back to the system, and at its lower end, vertical duct 26 connects with a horizontal duct 27. As the drawings indicate, ducts 26 and 27 are elongate, and are made up of a plurality of tubular sections which are secured in end-to-end relation in any suitable manner. A 90° elbow 27a is provided at the exit end of duct 27 and, as FIG. 2 particularly indicates, duct 27a leads into a conduit system 28 which includes a flow proportioning section 29, a burner 30 which will heat the air flow in conduit 28, and a fan 31 which blows the air flow through a return duct 32 leading back into the bin 10 to communicate with the plenum chamber 17. As FIG. 1 indicates, the peripheral exit of fan 31 is shown at 31a, and duct 32 is at a lower level than duct 27, as a result.

The proportioning section 29 is more particularly illustrated in FIG. 3, and comprises a hollow duct portion with top and bottom walls 33 and 34, and side walls 35. Half of the open front or egress end of the proportioning section 29 is covered by a screen 36, and the other half is open to the exit end of duct 27a. At its rear or egress side, the section 29 is completely open. Vertically spanning the front end of the section 29, is a support or brace 37, to which a flange on one side wall of elbow 27a may be affixed, flanges along the other side and the top and bottom of the egress end of elbow 27a, being secured to the walls 35, 33 and 34. Thus, at its front end, section 29 provides a pair of side-by-side inlet openings. In FIG. 3, the left side of section 29 between wall 35 and brace 37, provides an opening 38 to admit recycled air from the duct elbow 27a, and at the right side, between brace 37 and wall 35, the area covered by screen 36 is open to atmosphere to admit ambient or atmospheric air.

Provided rearwardly of the elbow 27a and screen 36, in section 29, is a slide gate generally designated 39, mounted for travel in a crosswise direction on support guide rods 40. High density, self-lubricating plastic bushings 41, mounted on the gate 39, slide on the rods 40, and provide a relatively friction-free travel.

Also fixed on the gate 39 is a nut 42 which may be of the recirculating ball variety. The nut 42 is mounted on a rotary screw shaft 43, journaled for rotation between the walls 35, in bearings 44, and mounted on the outer end of shaft 43, is a drive sprocket 45, which can be driven from reversible electric motor 46, through a sprocket 47 mounted on the output shaft 46a of motor 46, via a chain 48. Dependent on which direction shaft 43 is driven by reversible motor 46, gate 39 will be moved in one direction or the other along screw shaft 43. In the position in which the gate 39 is shown in FIG. 3, it is admitting half recycled air and half atmospheric air, into the conduit system 28.

The burner 30, which is not normally used, may be a conventional gas-fired burner, and requires no further description, since it is of a conventional nature.

Directing attention now to the control circuit shown in FIG. 5, the burner control relay is shown at 49, in a circuit line a. A motor relay for driving motor 46 in one direction is shown at 50 in a circuit line b, and a relay for driving motor 46 in the reverse direction is shown at 51 in a circuit line c.

Figure 2:
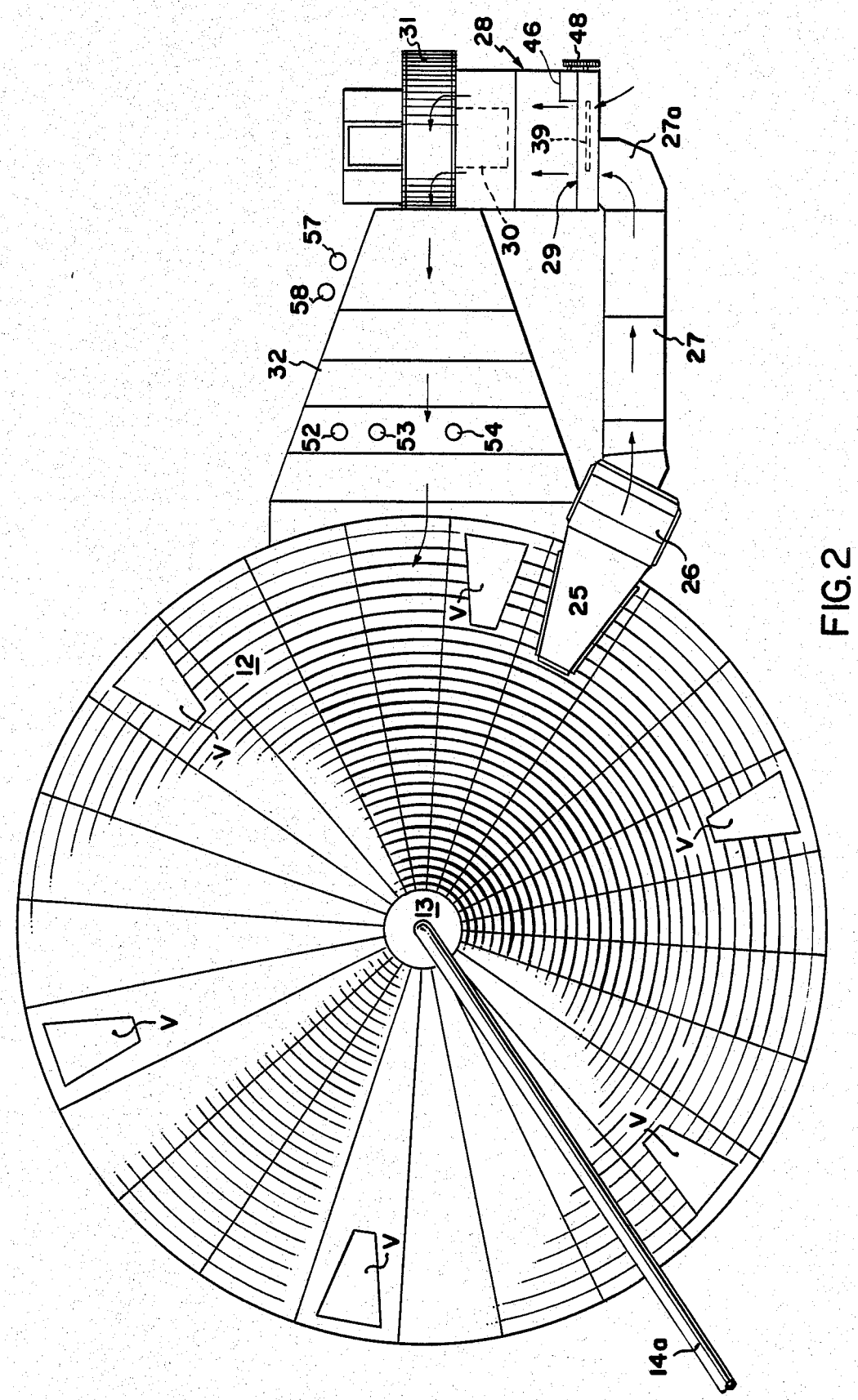
FIG. 2 is a top plan view thereof.

As FIG. 2 indicates, a "high" humidistat 52 and a "low" humidistat 53, sensitive to the humidity of the air flow in plenum chamber 17, can be provided in duct 32. Additionally, a thermostat 54, sensitive to the temperature of the air flow in plenum chamber 17, can be provided in duct 32. Provided in burner circuit a, are the thermostat contacts 54a in circuit with a manually operated switch S. Provided in circuit line b, are the high humidistat contacts 52a, together with a limit switch 55 which functions to shut off the motor 46 when the gate 39 travels all the way to the left, to completely close off elbow 27a. Provided in circuit line c, are the low humidistat contacts 53a, in series with a limit switch 56 which cuts off motor 46 at the end of travel of the gate 39 to the right, when all of the air flow is made up of recycled air from duct 27a. Also provided is a thermostat 57, having contacts 57a, which reads outside temperature, and a humidistat 58, having sensor contacts 58a which reads atmospheric humidity.

THE OPERATION

In operation, and assuming that some flow is being recycled through recycle duct ingress entrance 38, recycle duct gate 39 will be in a position somewhere between fully closed (i.e., when it completely blocks recycle duct 27) and fully open (i.e., when it completely blocks atmosphere inlet opening 36. At this time, the intake burner 30 is normally not operating and it should be understood that the purpose of the burner is only to hold the flow temperature at the desired level during periods of extreme outside humidity, or cold weather outside the normal range of temperatures which are expected to be encountered. Normally, levels are not adjusted via use of the burner and, rather, both the desired, interrelated humidity - temperature levels are maintained within desired ranges to achieve and maintain a desired humidity level in the grain optimum for storing it, by adjusting gate 39 to admit more or less recycled air into the mix of recycled and ambient (atmospheric) air. The louvered roof vents V, which are controlled by the static pressure inside the bins, are part way open when gate 39 is part way open, (and proportionately so), but automatically open fully when none of the exhaust air is recirculated, and automatically close fully to a lapping position when all of the exhaust air is to be recycled. Conventional humidistats 52 and 53 monitor the supply air flow humidity and will cause motor 46 to rotate in one direction or the other, dependent on whether the humidity sensed is above or below the set humidity control temperature. If sensor 53 indicates the drying air is below the humidity sensor setting, gate 39 will open and increase the amount of recirculated exhaust which is admitted via duct 27, while automatically decreasing the amount of outside air admitted through screen 36. If the drying air is above the humidity setting, humidistat 52 will cause motor 46 to run in the reverse direction to move gate 39 to decrease the amount of recirculated exhaust, while automatically increasing the volume of outside air admitted through screen 36. Because of the reciprocation capability of gate 39, exact proportioning is always achieved and "hunting" is minimized.

Typically, a ten percent differential is maintained between the humidity set on humidistats 52 and 53 for contacts 52a and 53a to close. For example, the high humidity contacts 52a may be set to close when the relative humidity reaches 60 percent, while the contacts 53a are set to close when the relative humidity reaches 50 percent. Dependent on outside or atmospheric conditions which are expected to exist during the drying operation, (i.e., 60 ° F. during the day, and 40° F. during the night), a table can be consulted for the moisture range desired in the grain to set the humidistats 52 and 53. For corn, for instance, the desired retained humidity range might be 12-13 percent moisture, and tables are available for the various grains and seeds (such as shelled corn and durum) to enable the operator to set the humidistats to achieve the desired equilibrium moisture content. Thus, if the desired moisture range is 12-13 percent, the table may indicate that for shelled corn, the setting of the high humidistat should be 60 percent, and the low humidistat 50 percent.

When grain is harvested, it may have a moisture content of 26 percent, but if stored at this higher moisture percentage, mold and subsequent expensive spoilage often results, thus the system here will necessarily reduce the moisture level in the grain to the 12-13 percent range. In the present system, drying will occur at about the same rate as a natural air system, and the air flow requirement is the same, i.e., if the corn has a 24 percent moisture - 3 c.f.m./per bushel, if it has a 22 percent moisture content, 1½ c.f.m./bushel, and if it has a 20 percent moisture content, ¾ c.f.m./bushel.

The contacts 57a will be closed to operate burner 49 when the outside humidity, as measured by humidistat 57, is indicated to be 10 percent or more above the set relative humidity for the high humidistat 52. When outside temperatures are below 32° F., but not as low as 25° F., thermostat contacts 58a will close to also operate burner 49. Operation at temperatures below 25° F. will be cost-ineffective.

Initially, gate 39 will, for a two to three day period, be in a position in which fully recycled air is provided without the addition of any atmospheric air, until the air has picked up sufficient moisture from the grain to saturate to the degree where atmospheric air can be admitted via the operation of the high humidistat 52.

While one embodiment of the invention has been described in detail, it will be apparent to those skilled in the art the disclosed embodiment may be modified. Therefore, the foregoing description is to be considered exemplary, rather than limiting, and the true scope of the invention is that defined in the following claims.

What is claimed is:

1. Improvements in in-bin, controlled atmosphere, drying systems comprising:
   a. a storage chamber including a base, a side wall enclosure, and a roof, for holding a supply or column of grain or the like;
   b. conduit means near the base thereof for introducing a flow of air to the lower end of the chamber;
   c. vent means near the upper end of the chamber for egressing air which has absorbed sufficient moisture from the grain to the atmosphere;
   d. a recycling duct leading from the upper end of the chamber back to said conduit means;
   e. a humidistat mechanism sensitive to the humidity of the air flow;
   f. a proportioning conduit portion communicating with said conduit means at an egress end and having an opposite inlet end with side-by-side inlet portions lying in substantially a common plane and together providing an inlet end of predetermined width, one inlet portion connecting with said recycling duct and the other being open to atmosphere, and said inlet portion connecting with said recycling duct communicating with said proportioning conduit portion over only a part of the said width of said inlet end;
   g. and motor driven slide means controlled by said humidistat and movable crosswisely back and forth relative to said width such as to admit more atmospheric air and less recycled air, or less atmospheric air and more recycled air, dependent on the humidity sensed by said humidistat mechanism.

2. The system of claim 1 wherein a temperature control sensitive to the temperature of the air flow in the chamber is provided to control a burner incorporated in said conduit means.

3. The system of claim 1 wherein a slide track essentially spans said proportioning conduit portion and the inlet portions; and said slide means comprises a slide gate; a reversible motor mechanism; and drive transmission elements connecting said gate and motor to move the gate back and forth to admit metered proportions of atmospheric and recycled air.

4. The system of claim 3 wherein said fan comprises a suction fan of a capacity to move the recycled air through said duct and gate, and the mix of recycled air and atmospheric air on into the lower end of said chamber.

5. The system of claim 4 wherein a plenum chamber is provided beneath the bin, and said bin has a perforate floor functioning as the top of the plenum chamber; and said conduit means leads into said plenum chamber.

6. The system of claim 5 wherein said humidistat mechanism includes a humidity sensor disposed to monitor the humidity of the air flow in the plenum chamber.

7. The system of claim 6 wherein louvers are provided for said vent means; and the static air pressure in said bin activates said louver means to adjusted positions between closed and open position.

8. The system of claim 7 wherein said louvers operate in synchronism with said slide gate to move to a more closed position when said slide gate is moved to admit more exhaust air and less outside air to said plenum chamber.

9. The system of claim 3 wherein said slide gate mounts a non-rotatable nut which is mounted on a rotatable screw shaft spanning said conduit portion; and said drive transmission elements drive said screw in one direction of rotation or the other.

10. The system of claim 6 wherein said humidistat mechanism includes a system which has high and low humidity sensors indicating when preset humidity percentages are, respectively, exceeded or not reached, for operating said slide gate to move in one direction or the other.

11. The system of claim 10 wherein burner mechanism is activated to heat the air mix downstream from said slide gate when the ambient humidity is a predetermined percentage greater than the humidity at which the high sensor is activated, or the ambient temperature less than a predetermined temperature.

* * * * *